United States Patent [19]
Wolf

[11] 3,778,610
[45] Dec. 11, 1973

[54] ADJUSTABLE JOINT FOR ELECTRICAL FIXTURES

[76] Inventor: Leo Wolf, 5701 Sheridan Rd., Chicago, Ill. 60660

[22] Filed: Dec. 4, 1972

[21] Appl. No.: 311,968

[52] U.S. Cl............ 240/73 BJ, 174/86, 240/81 BD, 248/280, 248/479, 287/14
[51] Int. Cl............................................. F21v 21/00
[58] Field of Search.............................. 174/86, 845; 287/1.4; 248/280, 274, 479; 240/81 BD, 73 BJ

[56] References Cited
UNITED STATES PATENTS
2,361,853  10/1944  Lundquist............................ 287/14
3,484,537  12/1969  Elliott................................. 174/86 X

*Primary Examiner*—Darrell L. Olay
*Attorney*—William E. Anderson et al.

[57] ABSTRACT

An adjustable joint for electrical fixtures and the like is constructed of two opposed hollowed housing members having circular mating surfaces that are toothed. A spring internally joins the two housing members and urges them together in a yieldably lockable arrangement. The spring is disposed and arranged to avoid passing through or blocking a passage between the circular mating surfaces, and provides a pivot for adjustment. The toothed mating surfaces serve as both a bearing and a lock.

6 Claims, 6 Drawing Figures

PATENTED DEC 11 1973　　　　　　　　　　3,778,610

ADJUSTABLE JOINT FOR ELECTRICAL FIXTURES

The present invention relates to adjustable joints, and more specifically it relates to adjustable joints for electrical conduits and fixtures.

Typically, an electrical conductor is carried within a tube or conduit from a source of electricity to an electrical fixture, such as a lamp or an electrical tool. The conduit both hides the electrical conductor and directs its path. Often this conduit will serve as an arm on which is mounted the fixture, and will include an adjustable joint as a component of the arm. The joint affords position adjustment of the fixture.

Such an adjustable joint may be constructed of two hollow housings that pivot about the center post. The conduit arms extend from these elements and can be angularly adjusted relative to one another around the center fixed by the post of the joint. When the electrical conductor is inserted through the region of the adjustable joint, it is pushed or "fished" through one of the arms into the joint and then out of the joint into the second arm.

In the manufacture of such an adjustable fixture assembly, the solid center post looms as an obstacle to the electrical conductor, and it is generally difficult to cause passage of the conductor through the assembled joint. The difficulty of fishing the electrical conductor through the joint is generally compounded by the small size of the joint. This allows little room with which to manipulate the conductor around the solid center post from one joint element to the other.

The very nature of the adjustable joint as a component of the arms permits the readjustment of the arms. The adjustment is readily made if the two mating halves of the housing are related to one another through a friction fit. A desired position change in this instance is easily accomplished, but there may be certain angular displacements which because of the weight of the fixture make it difficult for friction related parts to maintain a fixed position relative to one another. If, on the other hand, a positive lock arrangement is utilized, an inconvenience may be encountered in releasing and reengaging a particular locked position.

It is a primary object of the present invention to provide an improved adjustable joint for electrical fixtures.

It is another object of the present invention to provide an adjustable joint of the type stated in which the members of the joint provide a clear passage through the center of the joint for an electrical conductor.

It is a further object of the present invention to provide an adjustable joint that will retain a fast position at a given setting of the joint and yet yield when it is desired to adjust the setting.

It is yet another object of the present invention to provide an adjustable joint that is easily and quickly assembled, including the disposing therein of an electric conductor.

These and other objects of the invention are more particularly set forth in the following detailed description and in the accompanying drawings, of which:

Figure 1:
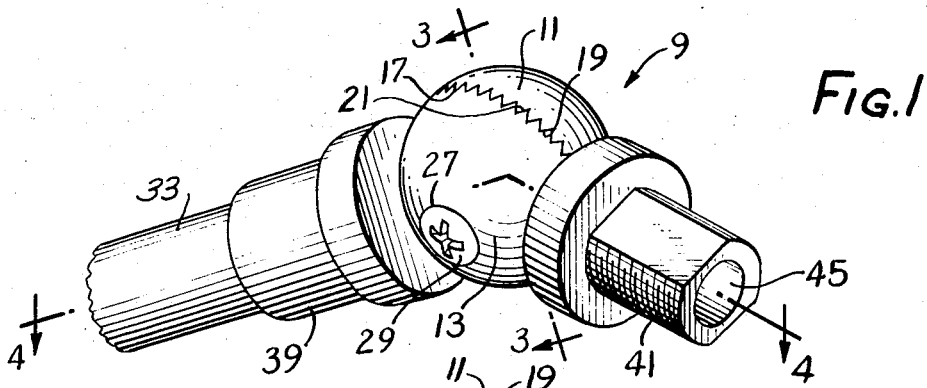
FIG. 1 is a perspective view of an adjustable joint according to a preferred embodiment of the present invention.
Figure 2:
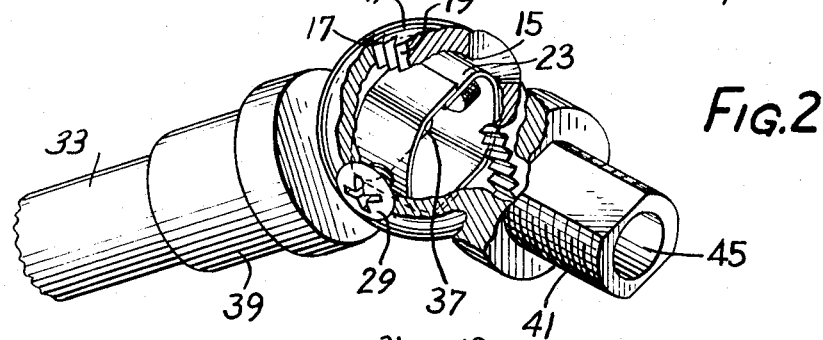
FIG. 2 is a perspective view of the adjustable joint of FIG. 1 with a portion cut away to expose inner members of the joint structure.
Figure 3:
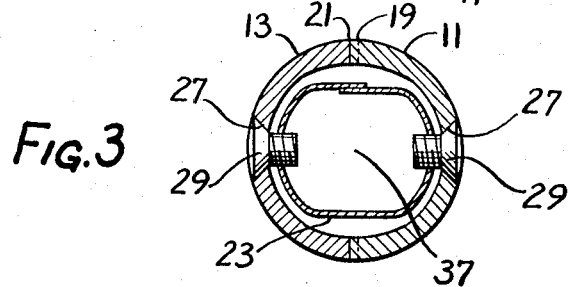
FIG. 3 is a cross section of a portion of the adjustable joint taken along the line 3—3 of FIG. 1.

Referring first to FIGS. 1-4, the reference numeral 9 generally indicates the adjustable joint according to the preferred embodiment of the present invention. The adjustable joint 9 includes a pair of hollow housing members 11 and 13 which oppose each other in a mating relation to form a cavity 15 (best seen in FIG. 4) between them. Serrations 17 are provided on the mating surfaces 19 and 21 of housing members 11 and 13, respectively.

Interposed between the housing members 11 and 13 in the cavity 15 is a spring 23 which is connected to each housing member to interlink them. The spring 23, described in more detail hereinafter, is formed in a generally elongated or oval shape and is provided with openings 25 dimetrically opposite each other in the ends of the oval. Each housing member has an opening 27 provided therein. When the spring 23 is assembled in the cavity 15 intermediate the housing members 11 and 13, the openings 25 in the spring each align with a corresponding opening 27 in each of the housings. A screw 29 connects each housing to the spring.

The two housing halves so interlinked can rotate relative to one another about the spring, the two screws 29 forming pivot points for the rotation. The serrations or teeth 17 on the opposing surfaces interfit with one another and form a ratchet action between the mating surfaces, each surface acting as a pawl against the other.

Figures 5, 6:
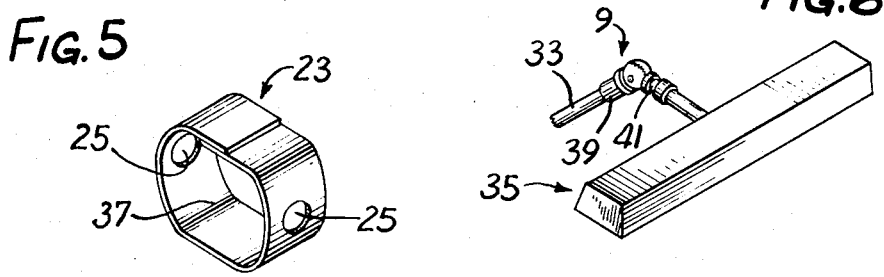
FIG. 5 is a perspective view of an inner member of the adjustable joint of FIG. 1 with dimensions exaggerated for clarity of illustration.
FIG. 6 is a perspective view of the adjustable joint of FIG. 1 utilized in combination with an electrical lamp fixture.

When an electrical conductor or lamp cord 31 is fed through the joint, it passes through the central region of the cavity 15. The adjustable joint 9 may be utilized as a component of a lamp arm 33 which is used to mount a lamp 35, as best seen in FIG. 6.

More specifically, the adjustable joint 9 is made preferably of a non-corrosive material, such as brass or aluminum, although other suitable materials may be used. The housing members 11, 13 in the illustrated embodiment are seen as being generally cup-shaped or semi-spherical. The mating surfaces 19, 21 of the housing members 11, 13 respectively are circular and of a generally equal diameter so that opposing inner and outer perimeters of the housing members will be in registration as the housing members rotate relative to one another. Thus, the mating surfaces 19, 21 are coextensive with respect to one another.

Although the form of the housing members 11,13 are presently illustrated as semi-spherical, it is understood that other forms may be desirable for aesthetic reasons. For example, a truncated conical form could be utilized. This form could stem from the circular mating surface and yet provide, when assembled with a like form, an adequent cavity 15.

Although the two housing halves pivot about the spring 23, the spring is not a bearing for the rotating parts. Rather, the housing members 11, 13 are urged together by the spring 23 and bearing pressure is applied at the mating surfaces 19, 21. As mentioned previously, these surfaces are serrated. Thus, the adjustable joint 9 is lockable, i.e., made fast by the interlinking of the respective parts in the joint. Because the spring 23 interlinks the housing members, the members are yieldably urged together rather than immovably mated. Thus, when a force is applied to the housing members to cause them to rotate with respect to one another, the serrated surfaces cam against one another, tending to separate the two housing members. This action distorts the spring 23, primarily in its end regions. The resiliency of the spring 23 causes the separated housing members to return to the lockable mating position as soon as the high points of the serrations pass one another.

The spring 23 is best seen in FIG. 5 and preferably comprises a flat strip which is formed into a generally oval shape, the ends of the strip being fastened together in a suitable manner, such as spot welding. This maintains the strip in its generally oval form. The openings 25, as mentioned previously, dimetrically oppose one another in the ends of the spring and are sufficiently large to accommodate the screws 29. These openings 25 may be threaded to receive complementary threaded portion of the screws 29, or, preferably, the screws are of a self-tapping type that thread themselves in the openings 25. The spring 23 may be of any suitable material, such as various spring metals, that has elastic characteristics so that when the oval form is distorted, particularly at its ends, it will tend to return to its original shape after removal of the forces which act to cause the distortion.

Although the spring 23 is illustrated herein as being in a generally oval shape, it could take the form of an ellipse or even a rectangle having rounded corners. It is noted that any of these shapes free the center of the enclosed form so that a passage 37 is provided therethrough. Thus, the substance of the spring 23 circumvents this passage and affords the extending or fishing therethrough of the lamp cord 31.

The assembly of the adjustable joint 9 is readily accomplished inasmuch as the individual members of the joint are few and the interlinking thereof simple. The mating halves or housing members 11,13 are brought together at their mating surfaces 19, 21 respectively with the spring 23 interposed inwardly of the hollow members and connected to each member by the screws 29. This assembly forms a sphere or ball configuration. In the assembled configuration, it will be noted that the elongation of the oblong or elongated spring 23 lies generally normal to the common general plane of the mating surfaces 11, 13. The screw openings are disposed on this line of elongation diametrically opposite each other.

Figure 4:
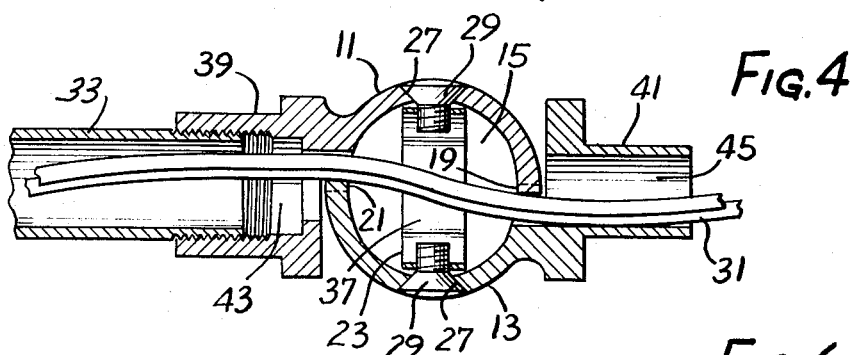
FIG. 4 is a longitudinal section of the adjustable joint taken along the line 4—4 of FIG. 1.

Extending laterally from and integrally associated with the semi-spherical portion of each housing member 11, 13 is a shank 39, 41 respectively. Each shank is generally in the form of a tube. A channel or bore 43 is provided in the shank 39 and a channel or bore 45 is provided in the shank 41. As seen in FIG. 4, the bore 43 and the bore 45 axially lie in a plane common to the plane of the mating surfaces 19, 21. Thus, the plane of the mating surfaces essentially bisects the bores 43, 45. Even during adjustment when the axes of the two bores intersect one another in an angular displacement, the plane of the axes and the mating surfaces remains common.

During assembly of the adjustable joint 9, the passage 37 is preferably aligned with the bores 39, 41 as they lie in a straight line. The screws 29 are then tightened. Thereafter, if only one of the two screws 29 is loosened sufficiently to afford adjustment, the spring 23 will retain its disposition with respect to at least one of the housing members 11 or 13 and their respective bores 39 or 41.

The shanks provide means for connecting and supporting other elements. For example, as seen in FIG. 6, a lamp fixture 35 may be connected to the shank 41 and the lamp arm 33 may be connected to the shank 39. The lamp arm 33 may be in the form of a conduit or tube which further extends to a base or mounting clamp (not shown) to provide a complete light fixture, for example, of the type commonly associated with a picture or painting frame or a speaker's lectern. As mentioned previously, the illustrated adjustable joint 9 may also be a component of an electric tool or of other types of light fixtures.

The shanks 39, 41 may be externally threaded, internally threaded, or plain on their peripheral surfaces, as may be suitable for the attaching parts.

Once the adjustable joint 9 is assembled and a lamp 35 and a lamp arm 33 respectively are connected to the assembly, it can be seen that there is essentially an unobstructed path through the entire assembly for the lamp cord 31. This structure makes possible a considerable saving in labor cost, since the lamp cord is easily inserted through the joint without the necessity of working it around a center obstacle in the joint. There is only a slight offset that the lamp cord 31 makes in passing from the bore 43 to the bore 45 in by-passing the mating surfaces 21, 19 respectively of the housing members 11, 13, (left to right in FIG. 4). This relative ease of inserting the lamp cord 33 for connection to the lamp fixture 35 reduces the overall labor cost of lamp fixture assembly.

It should be understood that although only one adjustable joint 9 has been illustrated and described in association with a lamp fixture, more than one such joint may be used in series where the planes of their respective mating surfaces are angularly displaced from one another to provide adjustment of the electrical fixture associated therewith to any desired position with respect to the source of electric power, i.e., up-down and left-right or three dimensional movement. Such multiple adjustable joints 9 may be useful, for example, in association with a lamp fixture for a draftman's table, where it may be desired to employ the light at varying angles and distance with respect to the table surface.

The operation of the adjustable joint is relatively simple. It has been mentioned that the adjustable joint 9 is lockable, but in a yieldable manner. The extent to which it yields and the ease with which it yields may be controlled by the amount of tightening applied to the screws 29. If one screw is backed off just slightly from its tightened position, the movement is eased by the reduction of force it takes to overcome the spring tension and afford the interfitting serrations to pass one another. Preferably, one screw always remains tight, and the relative tightness of the opposing screw 29 is determined by the anticipated frequency of position change or adjustment. A satisfactory amount of loosening of one screw can quickly be found that will provide the optimum between locking force and ease of swivel.

The present structural combination of the adjustable joint 9 provides several advantages over prior known devices. For example, the present structure does not obstruct the passage or threading of the electrical conductor through the center of the joint. This, of course, reduces fixture assembly time. Moreover, the combination facilitates adjustment or repositioning of an electric fixture by providing a re-engaging ratchet action between the serrations or teeth on the mating surfaces of the opposing halves of the joint while maintaining a yieldably lockable relation between the mating halves. These advantages are provided with relatively few and simple parts.

Although the present invention is susceptible to various modifications and alternative constructions, only a preferred embodiment has been shown in the drawings and described in detail. Such disclosure is not intended to lmiit the invention. The aim is to cover all modifications and alternative constructions falling within the spirit and scope of the invention as expressed in the appended claims.

Various features of the invention are set forth in the following claims.

What is claimed is:

1. An adjustable joint for electrical fixtures comprising a pair of oppositely disposed hollow housing members having serrated coextensive mating surfaces in circular form and spring means connected to and interposed inwardly of said hollow members interlinking the same and urging the same yieldably together, said spring means circumventing the center of said circular mating surfaces affording a passage therethrough from one housing member to the other.

2. The adjustable joint in accordance with claim 1 wherein said spring means comprises a flat strip formed and maintained in a generally oval shape and having elastic characteristics when distorted at either end of the oval form.

3. The adjustable joint in accordance with claim 2 wherein said spring means includes an opening at either end of the oval form to receive means for connecting said spring means to said housing members.

4. The adjustable joint in accordance with claim 3 wherein said spring means is connected to each of said hollow members by means of a self-tapping screw disposed through an opening in each of said housing members and into said opening at the corresponding end of said spring.

5. The adjustable joint in accordance with claim 1 wherein said spring means comprises a flat strip formed and maintained in a generally rectangular shape and having elastic characteristics when distorted at either end of the rectangular form.

6. The adjustable joint in accordance with claim 1 comprising means defining a bore in each of said hollow housing members, a lamp fixture connected to one of said members, and an electrical conductor disposed within said bore in each of said members, extending through said passage, and connected to said fixture.

* * * * *